United States Patent
Schuepbach et al.

(10) Patent No.: US 6,325,981 B1
(45) Date of Patent: Dec. 4, 2001

(54) APPARATUS AND METHOD FOR CURING A PHOTOCURABLE COATING PROVIDED ON A FIBER

(75) Inventors: Olivier Schuepbach, Hickory, NC (US); Carlos Pedrido, Boudry (CH)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/406,799

(22) Filed: Sep. 28, 1999

(51) Int. Cl.⁷ .................................................. B01J 19/08
(52) U.S. Cl. ...................................... 422/186.3; 250/492.1
(58) Field of Search ........................ 422/186.3; 250/492.1

(56) References Cited

U.S. PATENT DOCUMENTS

| | | |
|---|---|---|
| 4,591,724 | 5/1986 | Fuse et al. . |
| 5,000,541 | 3/1991 | DiMarcello et al. . |
| 5,062,687 | 11/1991 | Sapsford . |
| 5,114,738 | 5/1992 | Savage . |
| 5,157,755 | 10/1992 | Ooe et al. . |
| 5,171,609 | 12/1992 | Ury . |
| 5,235,666 | 8/1993 | Ooe et al. . |
| 5,320,658 | 6/1994 | Ohga et al. . |
| 5,320,659 | 6/1994 | Ishiguro et al. . |
| 5,346,520 | 9/1994 | Meabon et al. . |
| 5,593,736 | 1/1997 | Cowen et al. . |
| 5,636,307 | 6/1997 | Cowen et al. . |
| 5,828,071 | 10/1998 | Bourghelle et al. . |
| 5,851,450 | 12/1998 | Rennie et al. . |
| 5,942,020 * | 8/1999 | Marcelissen ........................... 65/350 |

\* cited by examiner

*Primary Examiner*—Kishor Mayekar
(74) *Attorney, Agent, or Firm*—Sughrue, Mion, Zinn, Macpeak & Seas, PLLC

(57) ABSTRACT

An apparatus for curing a photocurable coating provided on a fiber, includes an irradiator tube having an upstream end on which an injection assembly is provided, and a downstream end on which an exhaust assembly is provided. The injection assembly receives an inert gas flow. The injection assembly includes a diffuser that splits the inert gas flow into a counter flow and a tube flow. The counter flow is directed counter to the travel direction of the fiber, and the tube flow is directed in a laminar fashion through the irradiator tube. The exhaust assembly has a vent though which the tube flow is drawn, and an air opening provided between a downstream end of the irradiator tube and the exhaust vent.

15 Claims, 4 Drawing Sheets

APPARATUS AND METHOD FOR CURING A PHOTOCURABLE COATING PROVIDED ON A FIBER

FIELD OF THE INVENTION

The present invention relates in general to a curing apparatus used in the drawing process of an optical fiber, and more particularly to an apparatus that cures the photocurable coating as the coated fiber passes through the apparatus.

BACKGROUND

The manufacture of fiber optic cable involves drawing a preform to form a fiber. The drawn fiber is coated with a photocurable coating, and then exposed to ultraviolet (UV) radiation to cure the coating. The UV light activates photoinitiators in the coating that trigger the coating reaction as a whole. Typically, an irradiator tube, which is transparent to UV radiation, defines a space through which the fiber travels. The irradiator tube maintains an atmosphere which is inert with respect to the coating on the fiber, and also shields the fiber from vigorously circulated lamp coolant (blown air for example).

The polymerization (or curing) reaction is affected by several factors. First, oxygen in the irradiator tube inhibits the polymerization reaction. Oxygen may exist in the coating starting materials and in the irradiator tube during the cure process. The oxygen very rapidly combines with the activated photoinitiators in the coating to form a chemical with low reactivity. This essentially halts the curing reaction. Conventionally, therefore, an inert gas flow is provided through the irradiator tube to displace the oxygen in the fiber curing environment.

Second, the polymerization reaction rate is proportional to the UV light intensity to which the coating is exposed. Conventionally, therefore, by-products (or fumes) of the polymerization reaction are exhausted from the irradiator tube. Otherwise, these by-products would deposit on the irradiator tube and reduce the UV radiation impinging on the coating.

Third, it is important to strike a balance between the low oxygen concentration within the irradiator tube and the exhaustion of the coating cure by-products (or fumes) from the irradiator tube. For a particular application, the flow rate of the inert gas remains constant, and the flow rate of the exhaust is adjusted to achieve the desired balance. For example, if the exhaust flow is increased, the coating cure fumes are more effectively exhausted out of the irradiator tube. However, if the exhaust flow is too high, too much oxygen enters into the irradiator tube, thereby defeating the optimization of the curing reaction.

The conventional techniques for curing the coating on a fiber involve providing an inert gas flow through the irradiator tube and exhausting the curing fumes from the irradiator tube. Although these conventional techniques are generally thought to be acceptable, they are not without shortcomings. In particular, excessive amounts of oxygen and curing fumes still remain in the irradiator tube, thereby reducing the curing reaction efficiency. The curing fumes are particularly problematic because they darken the irradiator tube based on curing throughput. Thus, the irradiator tube must be periodically replaced. The replacement process reduces manufacture yields and limits the size of the draw run.

Further, the inert gas flows within the irradiator tube cause the fiber to vibrate when drawn. These vibrations may be inadvertently detected by a device that monitors the quality of the coating. As a result, the quality inspecting device may incorrectly determine that the fiber coating has defects.

SUMMARY OF THE INVENTION

The invention resides in an apparatus for curing a photocurable coating provided on a fiber. The apparatus includes an irradiator tube, an injection assembly, and an exhaust assembly.

The injection assembly is provided on an upstream end of the irradiator tube. The injection assembly receives an inert gas flow. The injection assembly includes a diffuser that separates the inert gas flow into a counter flow and a tube flow. The counter flow flows in a counter (or opposite) direction with respect to the fiber travel direction, and the tube flow flows in a laminar fashion, through the irradiator tube, in the fiber travel direction.

The exhaust assembly is provided on a downstream end of the irradiator tube. The exhaust assembly has an exhaust vent that draws the tube flow from the irradiator tube. An air opening is provided between the downstream end of the irradiator tube and the exhaust vent.

The present invention also resides in a method for curing the photocurable coating provided on the fiber. First, the coated fiber is transported through the irradiator tube in a fiber travel direction. An inert gas flow is directed toward the upstream end of the irradiator tube. The inert gas flow is then separated into a counter flow and a tube flow. The counter flow is directed along the coated fiber in a direction that is counter to the fiber travel direction. The tube flow is directed through the irradiator tube in a laminar fashion, and in the fiber travel direction. The tube flow is drawn from a downstream end of the irradiator tube and passed through a vent. Finally, an air flow is passed into the drawn tube flow, before the drawn tube flow passes through the vent.

The above and other features of the invention including various and novel details of construction and process steps will now be more particularly described with reference to the accompanying drawings and pointed out in the claims. It will be understood that the particular apparatus and method for curing a photocurable coating provided on a fiber embodying the invention is shown by way of illustration only and not as a limitation of the invention. The principles and features of this invention may be employed in varied and numerous embodiments without departing from the scope of the invention.

DETAILED DESCRIPTION OF THE INVENTION

I. The Apparatus

Figure 1:
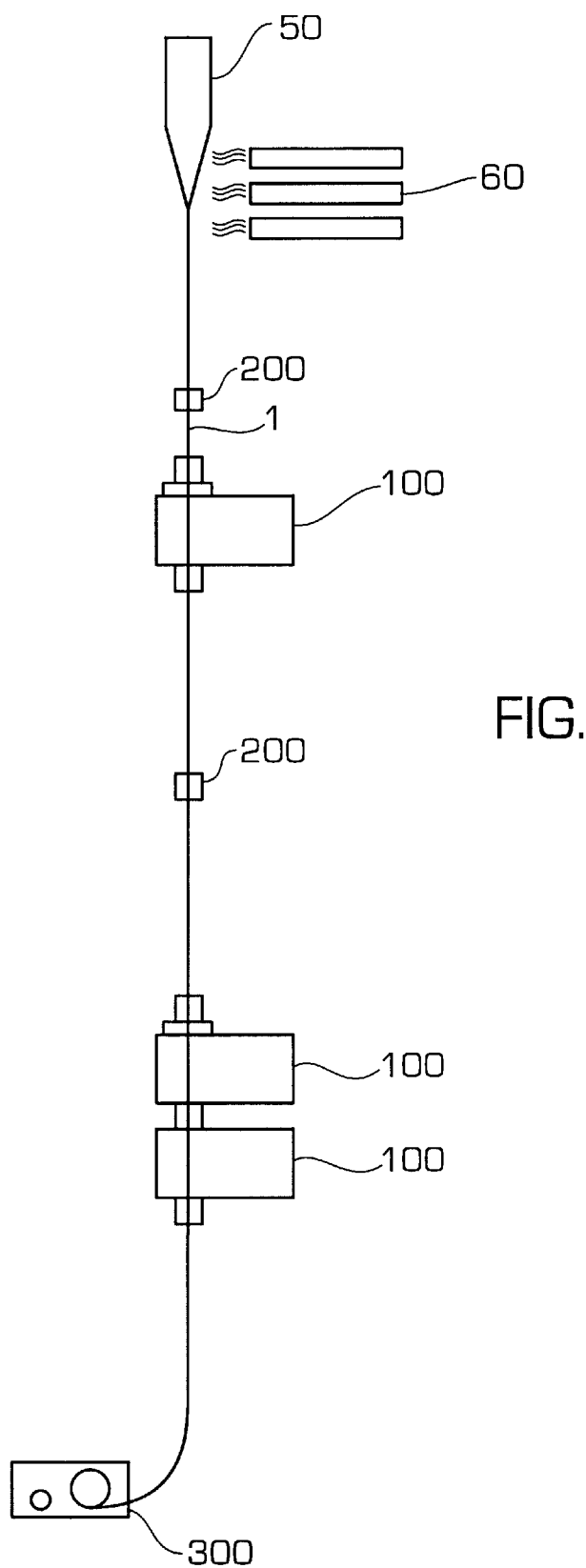
FIG. 1 is a schematic view of a device used to manufacture fiber optics incorporating a curing apparatus according to an embodiment of the present invention.

FIG. 1 schematically shows an exemplary device used to manufacture fiber optics. The device incorporates a curing apparatus 100 according to the present invention. The fiber is first drawn from a preform 50 that is heated by a heater 60. The drawn fiber continues through successive processing stations before being wound onto a capstan 300.

After being drawn, the fiber is fed through the coating device 200 that coats the fiber with a photocurable coating. The coated fiber 1 is then fed through the curing apparatus 100 in which UV lamps activate and cure the coating. As shown in FIG. 1, multiple curing apparatuses 100 may be adjacently positioned to cure a single coating. Also, multiple coating devices 200 may be provided along the travel path of the drawn fiber.

Figure 2:
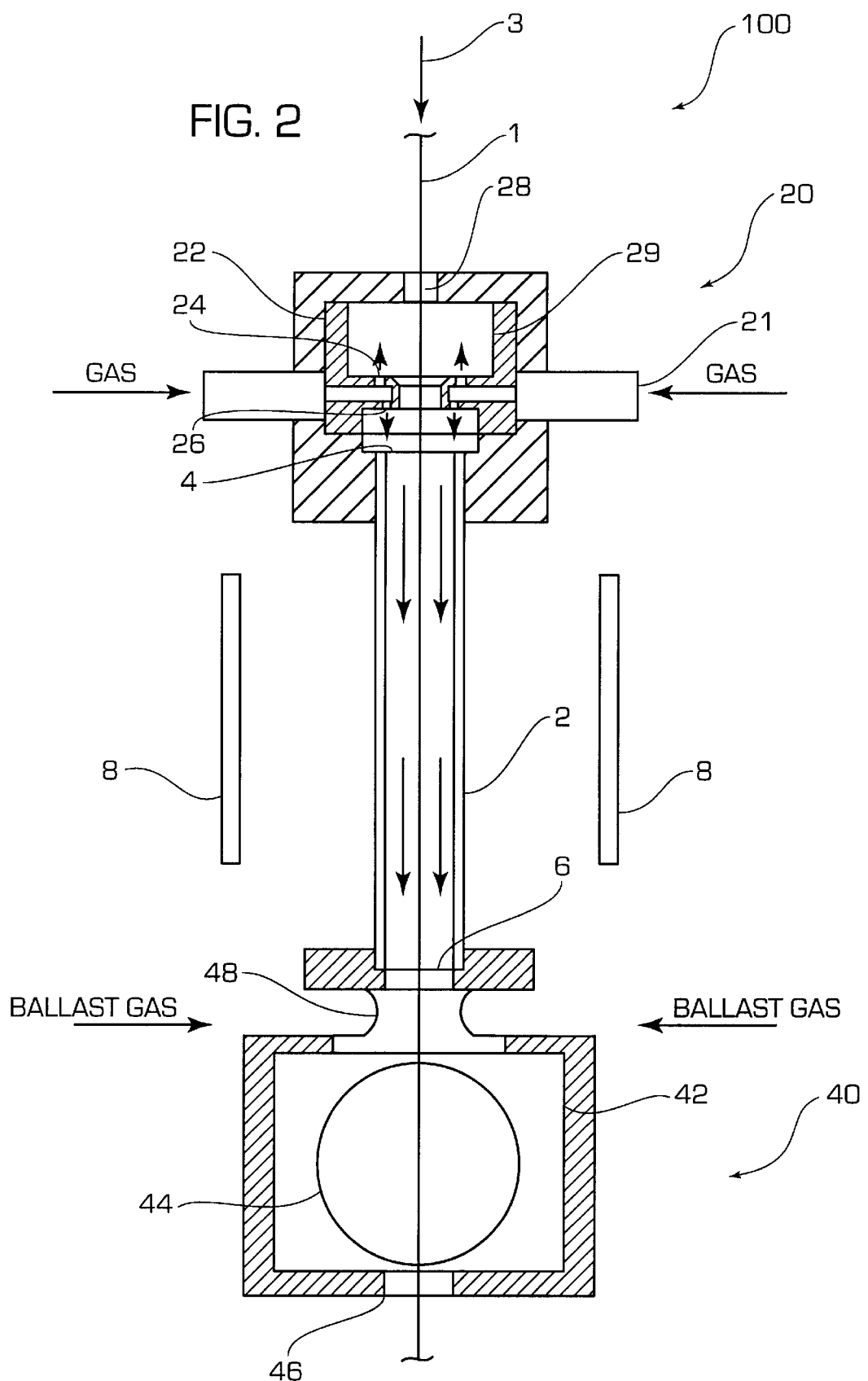
FIG. 2 is a sectional view of an apparatus for curing a photocurable coating provided on a fiber, according to an embodiment of the present invention.

FIG. 2 shows the curing apparatus 100 used to cure the photocurable coating provided on the fiber. The curing apparatus 100 includes an irradiator tube 2 having ends on which are respectively provided an injection assembly 20 (on the upstream end 4) and an exhaust assembly 40 (on the downstream end 6). After being drawn and coated, the fiber 1 travels in a travel direction (arrow 3) sequentially through the injection assembly 20, the irradiator tube 2, and the exhaust assembly 40.

The irradiator tube 2 may be fabricated from quartz, sapphire, or other material which transmits at least the portion of the spectrum that is used to cure the photocurable coating. In other words, the irradiator tube 2 should be transparent to UV radiation. Preferably, the radiator tube 2 also has heat resistant characteristics.

A UV source 8, positioned adjacent to the irradiator tube 2, emits UV radiation through the irradiator tube 2 and onto the coated fiber 1. Thus, the curing reaction is initiated as the fiber 1 passes through the irradiator tube 2.

The injection assembly 20 includes a pair of inlet ports 21 through which an inert gas flows. In FIG. 2, the inlet ports 21 are provided on opposite sides of the irradiator tube 2. However, the number and arrangement of the inlet ports 21 may vary depending on the particular application. The inlet ports 21 direct the inert gas flow to a diffuser 22 provided in the injection assembly 20.

Figure 3:
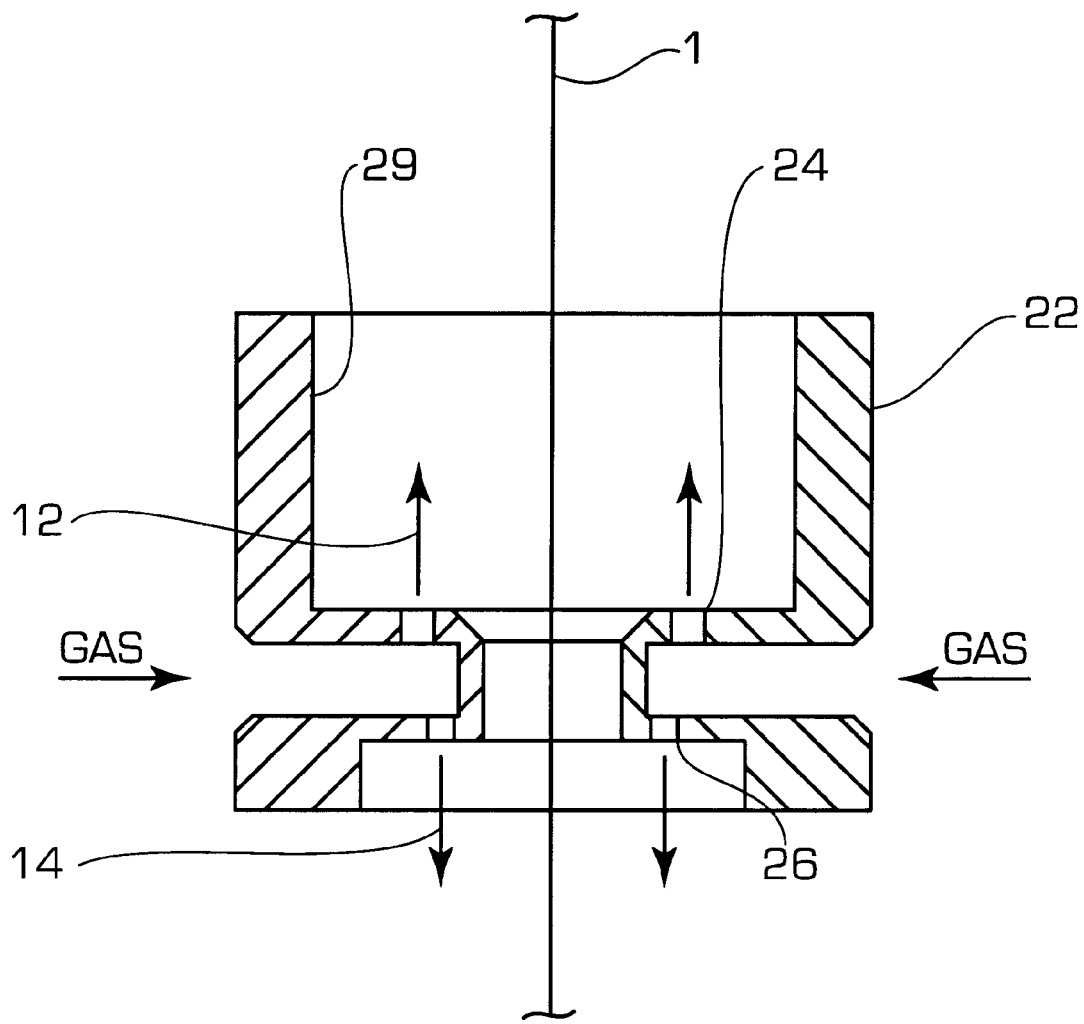
FIG. 3 is a sectional view of a diffuser of the apparatus shown in FIG. 1.

Turning briefly to FIG. 3, the diffuser 22 separates the inert gas flow into a counter flow 12 and a tube flow 14. Specifically, the diffuser 22 includes apertures 24 that direct a portion of the inert gas flow (the counter flow 12) into a pressure chamber 29, and apertures 26 that direct a portion of the inert gas flow (the tube flow 14) into the irradiator tube 2. It will be appreciated that the number, size, and arrangement of the apertures 24, 26 may vary depending on the desired flow rates of the counter flow 12 and tube flow 14.

Turning back to FIG. 2, the counter flow 12 enters into the pressure chamber 29 to strip off oxygen residing on the fiber 1, before the fiber 1 enters into the irradiator tube 2. The counter flow 12 then exits the curing apparatus 100 via a fiber inlet 28 provided in the injection assembly 20. At this time, the counter flow 12 moves counter to the fiber travel direction 3. In this way, the counter flow 12 prevents oxygen from entering into the curing apparatus 100.

The tube flow 14 is directed from the diffuser 22 in a laminar manner. Specifically, the apertures 26 in the diffuser 22 are axially aligned with the interior of the irradiator tube 2. Thus, the inert gas of the tube flow 14 travels along well-defined separate lines that are parallel to the fiber travel direction 3. In this way, the tube flow 14 passes through the irradiator tube 2 in the fiber travel direction 3, without vibrating the coated fiber 1. The tube flow 14 displaces oxygen and curing fumes out of the irradiator tube 2. The tube flow 14 exits the irradiator tube 2 via the down stream end 6, and enters into the exhaust assembly 40.

The exhaust assembly 40 includes an aspiration chamber 42 having an exhaust vent 44 through which the tube flow 14 and curing fumes are drawn. The exhaust assembly 40 also includes an air opening 48 provided upstream of the exhaust vent 44. The air opening 48 allows air to enter into the aspiration chamber 42. The location of the air opening 48 (between the irradiator tube 2 and the exhaust vent 44) allows fine tuning of the exhaust from the irradiator tube 2. Namely, the air flow lessens the strength of the exhaust from the irradiator tube 2, and thus dampens adjustments that are made to the exhaust flow rate through the exhaust vent 44. This fine tuning enables the most desirable conditions in the irradiator tube 2 to be obtained, i.e., a low oxygen concentration and an efficient exhaust of the curing fumes.

II. The Method

The fiber is first drawn from the preform 50 and coated by the coating device 200 with a photocurable coating. Then, the coated fiber 1 travels in the travel direction 3 through the curing apparatus 100.

As the coated fiber 1 travels through the curing apparatus 100, an inert gas flow is directed into the inlet ports 21. Typically, the inert gas flow is a nitrogen flow. It will be appreciated, however, that any gas may be used; so long as the gas is inert to the curing process. The diffuser 22 separates the inert gas flow into a counter flow 12 and a tube flow 14. The counter flow 12 travels against the fiber travel direction 3 and scrubs oxygen from the coated fiber 1, before it enters into the irradiator tube 2. The counter flow then exits the curing apparatus 100 via the fiber inlet 28. On the other hand, the tube flow 14 travels in the fiber travel direction in a like fashion. The tube flow 14 travels through the irradiator tube 2 and displaces oxygen and curing fumes from the irradiator tube 2.

The counter flow rate and the tube flow rate may vary from one application to the next. Preferably, however, these flow rates remain substantially constant during a single draw run. Moreover, it will be appreciated that the flow rates can be adjusted by changing the inert gas flow rate into the inlet ports 21. Also, the flow rates can be adjusted by replacing the diffuser 22 with another diffuser having a different aperture structure. For example, if the replacement diffuser has more apertures leading to the pressure chamber 29 (as compared to the original diffuser), the flow rate of the counter flow will increase.

The scrubbed fiber passes through the irradiator tube 2 and receives UV radiation from the irradiation source 8. The UV radiation cures the coating on the fiber. The curing reaction creates fumes.

The exhaust vent 44 in the exhaust assembly 40 draws the tube flow 14 and the curing fumes from the irradiator tube 2. The drawn tube flow 14 pulls air through the air opening 48 and into the aspiration chamber 42.

Those skilled in the art will appreciate that the curing conditions in the irradiator tube 2 may be optimized by adjusting the counter flow rate, the tube flow rate, and/or the exhaust flow rate. In this respect, a balance must be struck between competing goals (the low oxygen content, and the efficient exhaust of the curing fumes), to achieve the most desirable curing conditions. Preferably, the flow rate of the exhaust is adjusted according to the tube flow rate of the inert gas. The air passing through the air opening 48 advantageously allows the conditions in the irradiator tube 2 to be finely tuned. Moreover, the air opening 48 enhances the evacuation of curing fumes from the irradiator tube 2, and at the same time prevents the irradiator tube 2 from experiencing an excessive exhaust pressure.

Figure 4:
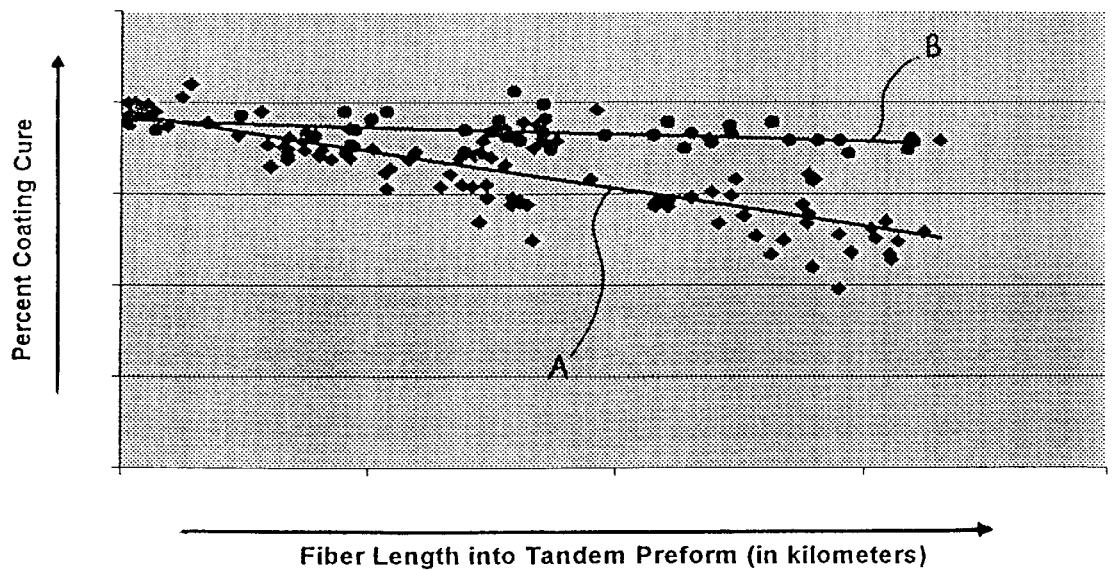
FIG. 4 is a diagram showing cure measurement results plotted as a function of the position of the fiber sample taken along the preform.

The improved results achieved by the present invention are illustrated in FIG. 4. In FIG. 4, the cure measurement results are plotted as a function of the position of the fiber sample taken along the preform from which it was drawn. The percent coating cure was obtained using a Fourier Transformer Infrared (FTIR) system. FTIR systems are well known in this art, and therefore will not be described in detail.

FIG. 4 presents comparative test results between a conventional curing technique and the curing technique according to the present invention. The diamonds in FIG. 4 represent cure measurements of fiber drawn using a conventional technique in which nitrogen flows in the irradiator tube counter to the fiber travel direction, and the nitrogen flow and curing fumes are exhausted from an upstream end of the irradiator tube. The circles represent cure measurements of fiber drawn using the method and apparatus according to an embodiment of the present invention.

FIG. 4 also illustrates two trend lines; a first trend line A fitted to the data obtained from the conventional curing technique, and a second trend line B fitted to the data obtained from the present invention. The trend lines A, B represent the average cure value for a given length along the fiber. The trend lines were computed by regression analysis.

The improved results of the present invention are attributable to the nearly oxygen-free environment maintained in the irradiator tube 2, and at the same time, the effective exhaustion of the curing fumes that would otherwise inhibit the curing reaction. In the present invention, the coated fiber is exposed to the same UV intensity throughout the preform draw run.

What is claimed is:

1. An apparatus for curing a photocurable coating provided on a fiber, the apparatus comprising:
    an irradiator tube configured so that the coated fiber is passable therethrough from an upstream end of said irradiator tube to a downstream end of said irradiator tube; and
    an injection assembly provided on said upstream end of said irradiator tube;
    wherein said injection assembly is adapted to inject a laminar flow of a gas through said irradiator tube.

2. The apparatus according to claim 1, wherein said injection assembly is configured so that the gas is flowable from said upstream end of said irradiator tube to said downstream end of said irradiator tube.

3. The apparatus according to claim 1, further including:
    an exhaust assembly provided on said downstream end of said irradiator tube, said exhaust assembly having an exhaust vent adapted to draw the gas from said irradiator tube;
    wherein said exhaust assembly includes an air opening provided between said downstream end of said irradiator tube and said exhaust vent.

4. The apparatus according to claim 1, further including:
    a fiber inlet provided in said injection assembly and configured so that the coated fiber is passable through said fiber inlet before entering into said irradiator tube; and
    a diffuser provided on said injection assembly, said diffuser adapted to separate a gas flow into (1) a counter flow that is passable through said fiber inlet, and (2) a tube flow that is passable through said irradiator tube in a laminar fashion.

5. The apparatus according to claim 1, wherein said injection assembly includes apertures that are axially aligned with an interior of said irradiator tube, said apertures adapted to flow the gas through said irradiator tube along lines that are parallel to the coated fiber.

6. An apparatus for curing a photocurable coating provided on a fiber, the apparatus comprising:
    an irradiator tube configured so that the coated fiber is passable therethrough from an upstream end of said irradiator tube to a downstream end of said irradiator tube;
    an injection assembly provided on said upstream end of said irradiator tube, said injection assembly adapted to inject a gas flow into said irradiator tube; and
    an exhaust assembly provided on said downstream end of said irradiator tube, said exhaust assembly having an exhaust vent adapted to draw the gas flow from said irradiator tube;
    wherein said exhaust assembly includes an air opening provided between said downstream end of said irradiator tube and said exhaust vent.

7. The apparatus according to claim 6, wherein said injection assembly is configured so that the gas is flowable in a laminar fashion through said irradiator tube.

8. The apparatus according to claim 6, wherein said injection assembly is configured so that the gas is flowable from said upstream end of said irradiator tube to said downstream end of said irradiator tube.

9. The apparatus according to claim 6, further including:
    a fiber inlet provided in said injection assembly and configured so that the coated fiber is passable through said fiber inlet before entering into said irradiator tube; and
    a diffuser provided on said injection assembly, said diffuser adapted to separate the gas flow into (1) a counter flow that is passable through said fiber inlet, and (2) a tube flow that is passable through said irradiator tube.

10. The apparatus according to claim 6, wherein said injection assembly includes apertures that are axially aligned with an interior of said irradiator tube, said apertures adapted to flow the gas through said irradiator tube along lines that are parallel to the coated fiber.

11. An apparatus for curing a photocurable coating provided on a fiber, the apparatus comprising:
    an irradiator tube configured so that the coated fiber is passable through said irradiator tube from an upstream end of said irradiator tube to a downstream end of said irradiator tube;
    an injection assembly provided on said upstream end of said irradiator tube, said injection assembly having a fiber inlet configured so that the coated fiber is passable through said fiber inlet before entering into said irradiator tube, said injection assembly adapted to receive a gas flow; and
    a diffuser provided on said injection assembly, said diffuser adapted to separate the gas flow into (1) a counter flow that is passable through said fiber inlet, and (2) a tube flow that is passable through said irradiator tube.

12. The apparatus according to claim 11, wherein said diffuser is configured so that the tube flow is flowable in a laminar fashion through said irradiator tube.

13. The apparatus according to claim 11, wherein said diffuser is configured so that the tube flow is flowable from said upstream end of said irradiator tube to said downstream end of said irradiator tube.

14. The apparatus according to claim 11, further including:
    an exhaust assembly provided on said downstream end of said irradiator tube, said exhaust assembly having an exhaust vent adapted to draw the tube flow from said irradiator tube;

wherein said exhaust assembly includes an air opening provided between said downstream end of said irradiator tube and said exhaust vent.

15. The apparatus according to claim 11, wherein said diffuser includes apertures that are axially aligned with an interior of said irradiator tube, said apertures adapted to pass the tube flow through said irradiator tube along lines that are parallel to the coated fiber.

* * * * *